United States Patent
Haas et al.

(10) Patent No.: US 6,835,248 B1
(45) Date of Patent: Dec. 28, 2004

(54) ROBOTIC PAINT APPLICATOR AND METHOD OF PROTECTING A PAINT ROBOT HAVING AND EXPLOSION PROOF ELECTRIC MOTOR

(75) Inventors: Jürgen Haas, Knittlingen (DE); Thomas Hezel, Asperg (DE); Marcus Frey, Weil der Stadt (DE)

(73) Assignee: Behr Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/686,922

(22) Filed: Oct. 16, 2003

(51) Int. Cl.[7] .................................................. B05C 5/02
(52) U.S. Cl. ........................ 118/323; 118/326; 427/421; 901/43
(58) Field of Search ................................. 118/323, 326; 427/421; 239/DIG. 14, DIG. 22; 901/43

(56) References Cited

U.S. PATENT DOCUMENTS

| | | | |
|---|---|---|---|
| 3,447,000 A | 5/1969 | Dugan et al. | |
| 4,698,568 A | * 10/1987 | Nishizawa et al. | 318/481 |
| 4,984,745 A | 1/1991 | Akeel et al. | |
| 5,440,916 A | * 8/1995 | Stone et al. | 73/23.31 |
| 5,949,209 A | * 9/1999 | Okamoto et al. | 318/563 |
| 6,328,799 B1 | * 12/2001 | Inoue et al. | 118/323 |
| 6,641,667 B2 | * 11/2003 | Ochiai et al. | 118/323 |

* cited by examiner

Primary Examiner—Laura Edwards
(74) Attorney, Agent, or Firm—Howard & Howard

(57) ABSTRACT

A robotic paint applicator having a plurality of relatively movable housing enclosures each including an explosion proof motor including a housing having a gas inlet and outlet, and a source of non-combustible gas under pressure connected to each motor housing inlet circulating non-combustible gas through the motor housing and directing non-combustible gas into the robot housing enclosures. The robot housing enclosures are substantially air-tight and interconnected with a control unit operating an inlet valve to maintain a predetermined pressure of non-combustible gas within each robot housing enclosure. The method of this invention includes purging the motor housings and robot enclosures at a first pressure and maintaining a lesser pressure of non-combustible gas following purging.

15 Claims, 6 Drawing Sheets

ROBOTIC PAINT APPLICATOR AND METHOD OF PROTECTING A PAINT ROBOT HAVING AND EXPLOSION PROOF ELECTRIC MOTOR

FIELD OF THE INVENTION

This invention relates to a robotic paint application system for use in a potentially explosive atmosphere, such as a paint booth, and a method of protecting a paint robot having an electric motor in such atmosphere.

BACKGROUND OF THE INVENTION

A conventional paint application system for mass production applications typically includes a plurality of rotary atomizers which are mounted on various fixtures to apply paint or other coatings to a substrate. The substrate, such an automotive body, is typically mounted on a conveyor which traverses the paint booth and is sprayed by the paint applicators. In one typical application, a plurality of overhead and side mounted rotary atomizers are mounted on a U-shaped frame assembly which moves on tracks with the vehicle body. The paint applicators, which may be conventional rotary atomizers or other conventional spray devices, may be mounted on robot arms to apply paint to all areas of the vehicle body as the vehicle body traverses the paint booth on a conveyor. The paint booth is generally enclosed because of the overspray and the potentially explosive atmosphere which may be created by the paint overspray. One example of a potentially explosive atmosphere is volatile organic compounds or vocs, including volatile organic solvents utilized as a solvent for paint. The paint overspray and solvents are continuously removed from the atmosphere of the paint spray booth by various recovery systems.

More recently, true robotic paint application systems are being used in mass production applications. A typical robotic paint applicator includes a base member, which may be mounted on the floor of the paint spray booth or mounted on a rail to traverse with the substrate mounted on a conveyor, an intermediate section or housing, typically pivotally or rotatably mounted on the base member, and a generally horizontal robot arm pivotally mounted on the intermediate member having a paint applicator, generally a rotary paint atomizer, at its distal end. The intermediate section and the robot arm are then manipulated by motors generally connected to a computer, to continuously move the paint applicator to apply paint over the substrate as the substrate is moved through the paint booth. The movement of the intermediate section and the robot arm may be controlled by hydraulic motors. However, hydraulic controls are expensive, complicated and subject to failure. Electric motors, particularly servomotors, have replaced hydraulic controls because servomotors provide better control at less cost and servomotors have less service problems. However, electric servomotors have a potential for sparking and thus create potential safety issues in a potentially explosive atmosphere, such as a paint booth applying liquid paint having an organic solvent. Conventional sealed explosion proof servomotors are not practical in this application because of the bulk and weight of such explosion proof motors.

The prior art has proposed flooding the section compartments or enclosures containing "non-explosion proof motors" with an "inert gas," such as air or nitrogen, to prevent entry of the potentially combustible atmosphere in the paint booth, such as disclosed, for example, in U.S. Pat. No. 4,984,745. However, this approach has several problems. First, there are typically compartments within the enclosures, particularly including the housing of the servomotor. That is, this patent proposes to use conventional or "non-explosion proof" servomotors having a housing which is not sealed or explosion proof. As will be understood by those skilled in this art, a conventional paint application system does not run continuously. That is, the paint application system is periodically shut down for shift changes, maintenance, etc., and the paint application line may be shut down for one or more eight hour shifts. Thus, potentially combustible gas from the paint booth will enter the robot housing enclosures and the compartments within the housing enclosures, including the motor housings, when the supply of non-combustible gas supplied to the base member is turned off, such as when the paint application system is idle. When the combustible gas enters the housing enclosures containing the non-explosion proof servomotors, the combustible gas may also enter the housings of the servomotors creating a potential explosion hazard. However, flooding the housing enclosures containing the servomotors with a non-combustible gas will not necessarily purge combustible gas in the servomotor housings, creating a potentially explosive atmosphere in the motor housings. Further, circulating the non-combustible gas to the base or lower housing enclosures to the other enclosures of the robot may not thoroughly purge the components within the enclosures. Thus, there is a need for an improved robotic paint applicator and method of protecting a paint robot having electric motors from explosion in an enclosed paint booth having a potentially combustible atmosphere. The robotic paint applicator system and method of this invention solves this problem in a simple, cost effective manner.

SUMMARY OF THE INVENTION

The robotic paint applicator and method of this invention begins with the electric motor which, as set forth above, is preferably an electric servomotor to provide accurate and fast control of the robotic paint applicator. The electric motor includes the conventional components of an electric motor, including a stator, rotor and drive shaft. The explosion proof electric motor utilized in the paint applicator of this invention includes a relatively air-tight housing surrounding the electrical components of the motor, wherein the housing includes a gas inlet and a gas outlet spaced from the gas inlet. A source of non-combustible gas under pressure is connected to a gas inlet of the motor housing and the non-combustible gas thus creates a positive pressure of non-combustible gas within the motor housing, purging the motor housing and preventing entry of potentially combustible gas into the motor housing. Thus, the servomotors utilized in the robotic paint applicator of this invention are explosion proof. Further, the enclosures of the sections of the robotic paint applicator containing the explosion proof motors are generally or nearly air tight, such that the non-combustible gas is received from the gas outlet of the motor housings into the robot housing enclosures, providing those housing enclosures with non-combustible gas, thereby creating explosion proof robot housing enclosures.

As set forth below in regard to the method of this invention, the non-combustible gas, such as air, is initially supplied to the motor housings with sufficient pressure, such as 4 bar, to purge not only the motor housing, but also the robot section enclosure containing the electric motor and the further electrical parts or components contained within the enclosure. Following purging, the non-combustible gas is supplied to the motor housing at a lesser pressure, preferably at least 0.8 mbar, to maintain a positive pressure of non-combustible gas greater than atmospheric in the motor housings and the robot section enclosures. In a preferred embodiment, the motor housing includes an inlet which receives the non-combustible gas and a tube which communicates with the electrical components of the electric motor including the windings and rotor, and an outlet or exit port preferably having a diameter greater than the inlet. In the disclosed embodiment, the gas outlet is "a flame restrictor" filter. As used herein, the term "explosion proof electric motor" means a conventional electric motor, particularly including an electric servomotor, including an enclosed housing having gas inlets and outlets as described above, but excludes "non-explosion proof" electric motors.

The robotic paint applicator of this invention includes a housing enclosure, preferably a substantially or nearly air tight robot housing enclosure, containing an explosion proof electric motor and a robot arm mounted on the robot enclosure having a paint applicator on a distal end of the robot arm. As set forth above, the robot arm of the paint applicator generally also includes a wrist or wrist mechanism and the applicator is typically a rotary paint atomizer, but may be any type of applicator. The robot paint applicator is typically located in an enclosed paint booth having a potentially combustible atmosphere including, for example, a solvent containing vocs. As described above, the explosion proof electric motor includes a motor housing having a gas inlet, a gas outlet and a source of non-combustible gas under pressure, preferably located outside the paint spray booth, connected to the gas inlet of the motor housing, pressurizing the motor housing with non-combustible gas for purging and preventing the potentially combustible atmosphere from entering the motor housing. The gas outlet of the motor housing directs non-combustible gas into the nearly air-tight robot enclosure containing the electric motor, creating a positive pressure of non-combustible gas within the robot enclosure and preventing the potentially combustible gas from entering the robot enclosure, thereby protecting other electrical components within the robot enclosures, such as wires, switches and the like, from being exposed to the potentially combustible atmosphere of the paint spray booth. In a typical application of the robotic paint applicator of this invention, each of the robot enclosures or section components of the base, the intermediate sections or members and the robot arm includes at least one electric motor for manipulating the paint applicator and at least one of the robot enclosures may include a plurality of explosion proof electric motors. In such embodiments, each of the explosion proof electric motors include a motor housing having a gas inlet and a gas outlet and the robotic paint applicator includes a plurality of conduits, each of which is connected to the source of non-combustible gas under pressure, such that each of the motor housings is directly flushed or purged with clean non-combustible gas directly from the source and each of the robot enclosures or compartments is maintained at a positive pressure of non-combustible gas received through the gas outlet of the motor housings. In one preferred embodiment, the robot enclosures containing the explosion proof electric motors are in fluid communication, having conduits between adjacent enclosures, such that non-combustible gas received from the explosion proof motors is directed from one robot enclosure to the next robot enclosure to an outlet in the lower enclosure or base member, assuring complete purging and maintenance of a positive pressure of non-combustible gas within each of the enclosures.

The preferred method of protecting a paint robot having an electric motor from explosion in an enclosed paint spray booth having a combustible atmosphere of this invention includes first enclosing an explosion proof electric motor or electric motors and controls in a substantially air-tight enclosure. As used herein, the term "substantially air-tight" means that the enclosure or compartment is substantially completely enclosed as is conventional for such enclosures, such that a positive gas pressure may be maintained in the robot housing enclosure. The method of this invention further includes providing an explosion proof electrical motor with a substantially air-tight motor housing having a gas inlet and a gas outlet preferably spaced from the gas inlet as described above.

The method of this invention then includes purging the motor housing and the robot enclosure containing the explosion proof electric motor by supplying a non-combustible gas, preferably air, under pressure to the gas inlet of the motor housing under sufficient pressure to circulate the non-combustible gas through the motor housing and through the gas outlet into the robot section enclosure, purging the motor housing and the robot section enclosure of potentially combustible gas. In a preferred embodiment, during the purging step, air is supplied to the motor housing at a pressure of about 4 bars and the volume of air supplied to the motor housing is preferably at least 5 times or between about 5 and 10 times the volume of the motor housing and the robot housing enclosure which contains the explosion proof electric motor. This volume and pressure assures complete purging of combustible gas from the motor housing and the robot housing enclosure. The explosion proof electric motors can then be safely operated to control the paint robot. Finally, the method of this invention includes continuing to supply the non-combustible gas to the inlet of each of the motor housings at a lesser pressure sufficient to maintain the motor housings and the robot housing enclosures at a positive pressure, thereby preventing combustible gas from entering the housing enclosures and the motor housings. A pressure of about 0.8 mbar is generally sufficient to maintain a positive pressure of non-combustible gas in the motor housings and the robot enclosures containing the motor housings. As set forth above, where the paint robot includes a plurality of explosion proof electric motors, the method of this invention includes separately purging each of the motor housings and the robot housing enclosures by delivering non-combustible gas under pressure from a source of non-combustible gas, preferably located outside the paint booth, separately connected to each of the inlets of the motor housings as described above.

The robot paint applicator and method of this invention will be more fully understood from the following description of the preferred embodiments, the appended claims and the drawings, a brief description of which follows.

BRIEF DESCRIPTION OF THE DRAWINGS

FIG. 1A is an end elevation of the explosion proof servomotor shown in FIG. 1;

DESCRIPTION OF THE PREFERRED EMBODIMENTS

Figure 1:
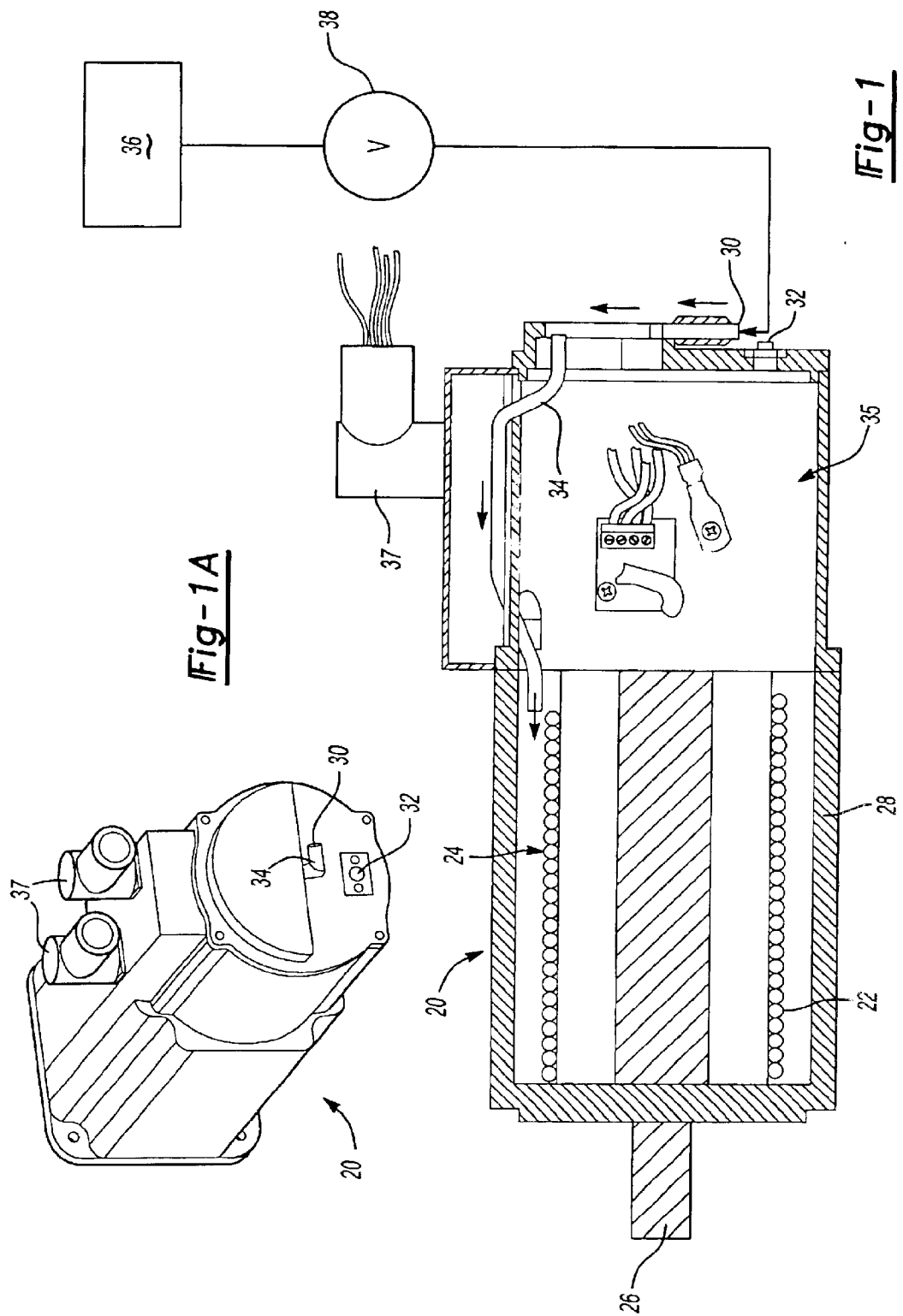
FIG. 1 is a side cross-sectional view of one embodiment of an explosion proof servomotor utilized in the robotic paint applicator of this invention.

FIG. 1 illustrates one embodiment of an explosion proof lectric motor 20 adapted for use in a robotic paint applicator of this invention as described below. In a preferred embodiment, the explosion proof electric motor 20 is an electric servomotor including a conventional stator 22, rotor 24 and drive shaft 26. The explosion proof electric motor 20 utilized in the robotic paint applicator of this invention includes a substantially air-tight motor housing 28 including a gas inlet 30 and a gas outlet 32. As described above, the motor housing 28 should be sufficiently air-tight to maintain a positive gas pressure upon receipt of a non-combustible gas. Thus, the gas inlet 30 preferably has a smaller diameter opening than the gas outlet 32 to maintain a positive non-combustible gas pressure within the housing. The gas outlet 32, preferably includes a disc-shaped flame restrictor filter. The gas inlet 30 is connected to a source of non-combustible gas under pressure 36 which, in a preferred embodiment, is air. The source of non-combustible gas 36 is connected to the inlet 30 through a valve 38 which is connected to a control (not shown) which, as described below with regard to the method of protecting a paint robot from explosion of this invention, may be utilized to control the volume or pressure of non-combustible gas received by the gas inlet 30 or may be turned off during maintenance or when the paint applicator is idle for an extended period of time. The gas inlet 30 is connected to a tube 34 having an outlet within the electric motor to purge the primary components of the servomotor including the stator 22 and rotor 24 as shown by the arrows in FIG. 1. The non-combustible gas thus circulates through the components of the electric servomotor including the stator 22 and rotor 24 and returns through a junction box 35 containing further electrical components, such as relays, switches and the like. FIG. 1A is a perspective view of the explosion proof servo electric motor 20 described above illustrating the non-combustible gas inlet 30 to the motor housing 28 and the outlet 32. The illustrated embodiment further includes a plurality of conventional electrical connectors 37 which receive the wires to the electrical components of the explosion proof servomotor 20 (not shown), preferably in sealed relation to avoid entry of combustible gas into the motor housing.

As described below, the explosion proof electric motor 20 is initially purged of potentially combustible gas by directing air or another non-combustible gas, such as nitrogen, from the source 36 through the valve 38 to the inlet 30 of the electric motor 20. The air under pressure is initially received in the junction box 35 by tube 34 which communicates with the stator 22 and rotor 24 and the air is then circulated through the junction box and discharged through the outlet 32 into a robot enclosure containing the electric motor, also purging the enclosure as described below. Following purging, the explosion proof electric motor 20 may be actuated and the air pressure is then reduced by valve 38 to maintain a positive pressure of non-combustible gas in the housing 28 during operation of the robot as described below.

Thus, the motor 20 is properly classified as an explosion proof motor under the Standard for Purged and Pressurized Enclosures for Electrical Equipment in Hazardous (Classified) Locations, NFPA 496-7 for Class I, Division 1 Locations in which ignitable concentrations of flammable gases or vapors exist under normal operating conditions, such as a paint spray booth, because the motor housing is purged with a non-combustible gas and then maintained at a pressure greater than atmospheric pressure pursuant to Chapter 2, 2–2.3.1, supra. Thus, the explosion proof servomotors utilized in the robotic paint applicator of this invention are nonhazardous.

Figure 2:
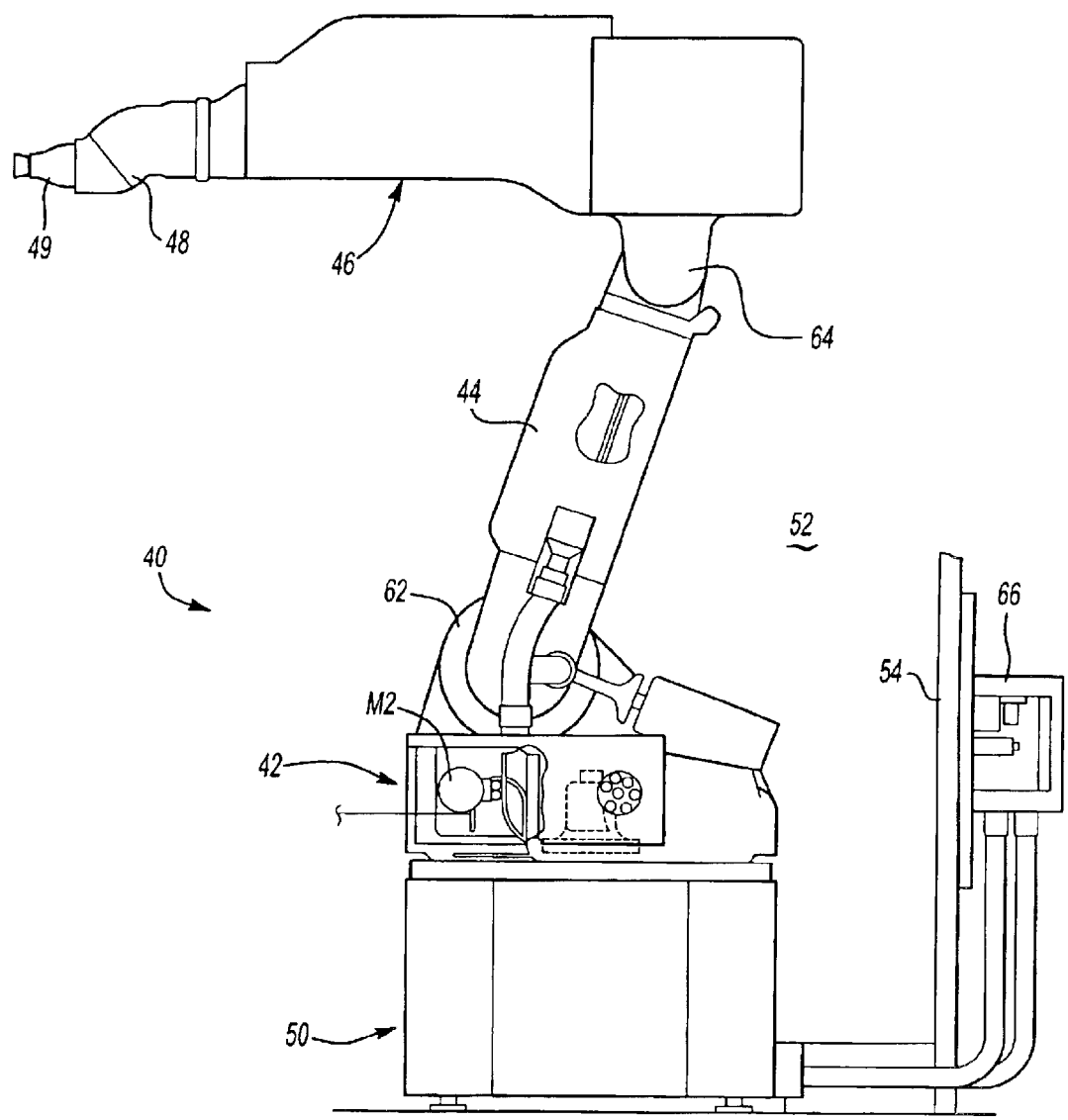
FIG. 2 is a side view partially cross-sectioned of one embodiment of a robotic paint applicator of this invention.
Figure 3:
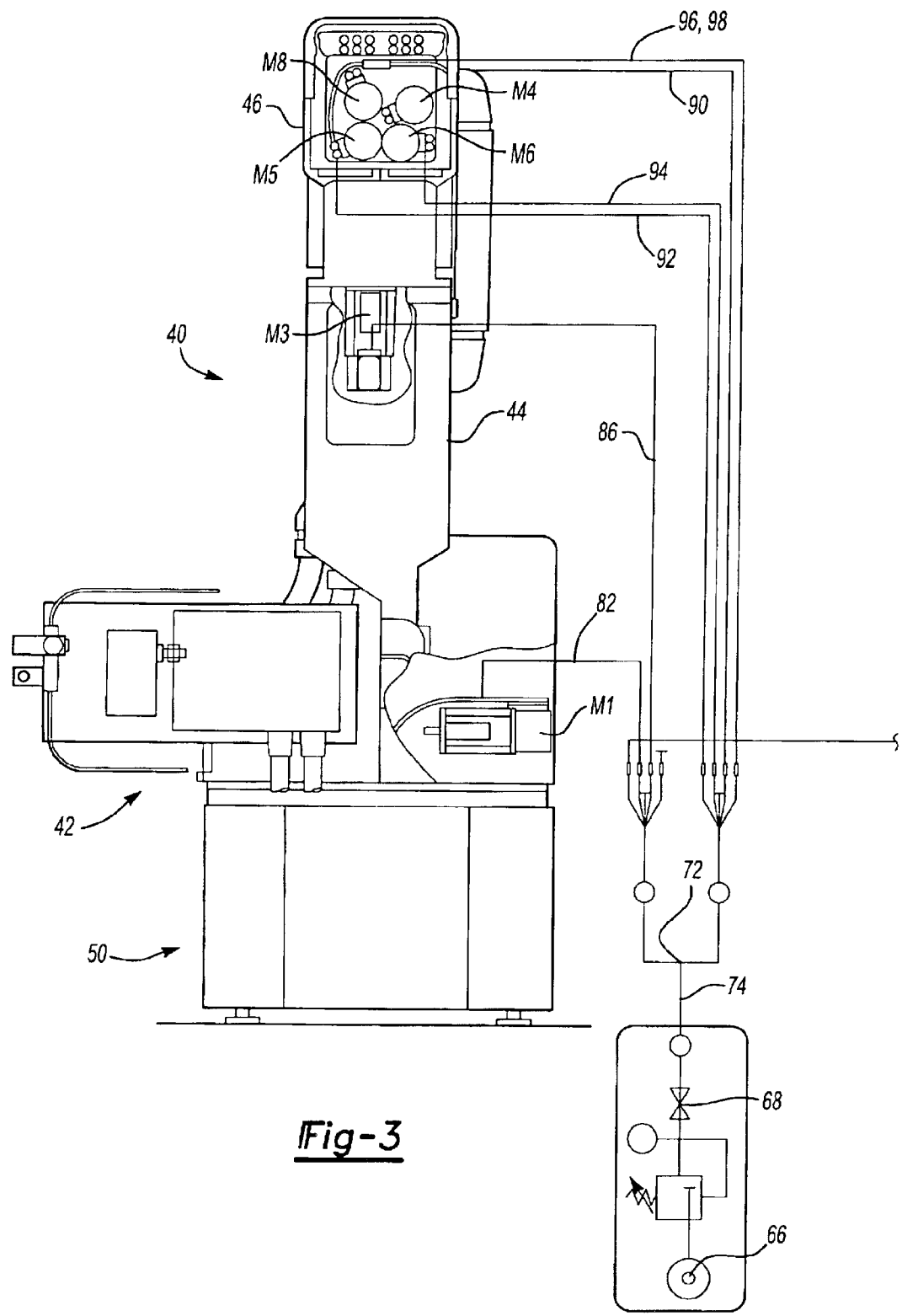
FIG. 3 is a side partially cross-sectioned view of the robotic paint applicator shown in FIG. 2 with schematics illustrating the purging system.

FIGS. 2 and 3 illustrate one suitable embodiment of a robotic paint applicator 40 of this invention. In describing the robotic paint applicator 40, reference will also be made to FIG. 6, which is a schematic illustration of the primary electrical components of the robotic paint applicator and the air circulation and purging system of this invention. The robotic paint applicator 40 illustrated in FIGS. 2 and 3 includes a base housing or section 42, an intermediate housing or section 44 mounted on the base section 42 and a robot arm 46 mounted on the intermediate section 44. The robot arm includes a wrist 48 at its distal end which receives a conventional rotary paint atomizer 49. In this embodiment, the base section 42 is mounted on a support section 50, which is supported by the floor of the paint booth 52. As will be understood by those skilled in this art, the paint booth 52 is an enclosed work area including a potentially explosive atmosphere separated and enclosed from the remainder of the paint shop by a wall 54 shown in FIG. 2. This embodiment of the robotic paint applicator 20 includes six to eight explosion proof electric servomotors labeled M1 through M8 in FIGS. 2, 3 and 6. Electric servomotors M1 and M2 are located in the base section 42, explosion proof electric servomotor M3 is located in the intermediate section 44 and electric servomotors M4 to M8 (where the robot includes eight servomotors) are located in the robot arm 46 as shown in FIGS. 2 and 3 and also in FIG. 6. Each of the explosion proof servomotors M1 to M8 is enclosed within the substantially or nearly air-tight enclosures provided by the housings of the robot sections 42, 44 and 46 which, as described above, are sufficiently air-tight to permit purging and maintain a positive pressure of a non-combustible gas within the enclosure. Thus, explosion proof electric servomotors M1 and M2 are enclosed within the base housing 42, explosion proof electric servomotor M3 is enclosed within the intermediate section 44 and explosion proof electric servomotors M4 to M8 are enclosed within the robot arm housing 46, each forming a substantially air-tight enclosure.

As will be understood by those skilled in this art, a robotic paint applicator of the type 40 illustrated in FIGS. 2 and 3 includes numerous components and controls which do not form any part of this invention and will not, therefore, be described in any detail. However, as will be understood by those skilled in this art, the intermediate section 44 is pivotally supported on the base section 42 by a pivot joint 62 and the robot arm 46 is pivotally supported by the pivot joint 64. The base section 56 may be rotatably supported on the support section 50. The electric servomotors M1 through M8 control the movement of the robotic paint applicator 40 including the wrist 48. Thus, the paint applicator 49 mounted on the wrist 48 may be moved and controlled by the electric servomotors M1 to M8 during application of paint or other coating to a substrate (not shown), such an automotive body, which is typically transferred through the paint booth 52 on a conveyor (not shown).

Figure 6:
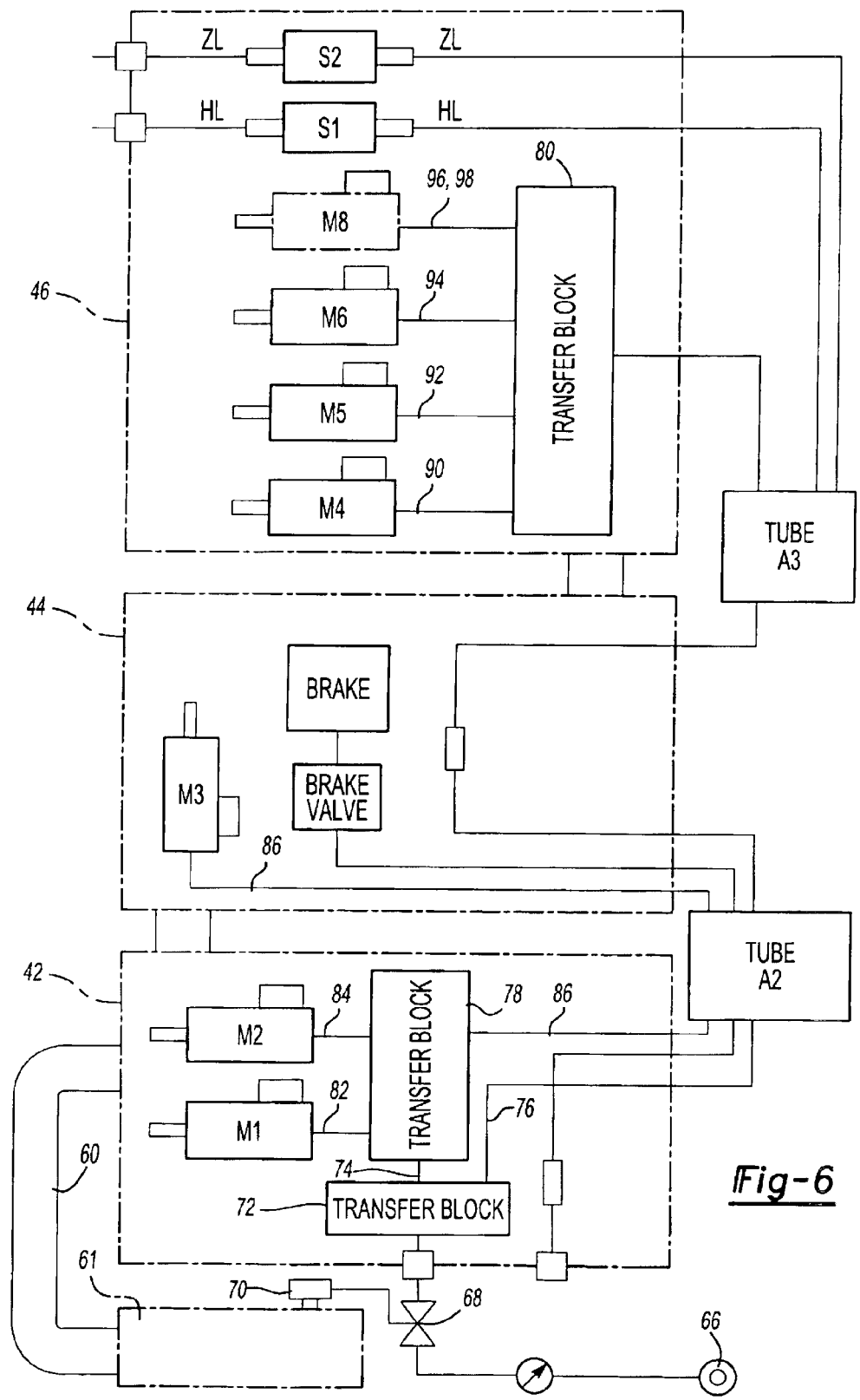
FIG. 6 is a schematic illustration of the purge system utilized in the robotic paint applicators of FIGS. 2 to 5.

In a typical application, the robotic paint applicator 40 is substantially in continuous motion during operation to apply paint to an entire surface of a large substrate, such as an automotive body. As will also be understood, the housing enclosures 42, 44 and 46 will include other electrical components, such as the solenoid valves S1 and S2 in the robot arm 46 shown in FIG. 6, wires, switches, etc. which are maintained in a non-combustible or explosion proof atmosphere in the robotic paint applicator of this invention as described below. FIGS. 2, 3 and 6 illustrate schematically the air purge and pressurizing system for the robotic paint applicator 40 of this invention. As best shown in FIG. 6, the purge and pressurizing system includes a source of non-combustible gas or air source 66 which is located outside the paint booth 52 as shown in FIG. 2. The air under pressure is received by a valve 68 which is controlled by the control unit 70. As set forth above and further described below, the proportional valve 68 may be controlled by the control unit 70 to control the pressure and, therefore, the volume of air received by the first transfer block 72 which may be located in the base section 42 of the robotic paint applicator. The transfer block 72 divides the air or other non-combustible gas into a first line or conduit 74 and a second line or conduit 76. The air received from the first transfer block 72 is then received through line 74 to a second transfer block 78 and the air through line 76 is received by a third transfer block 80. The second transfer block 78 divides the air under pressure into three lines 82, 84 and 86. Line 82 is connected to the gas inlet 30 (see FIG. 1) of the first electric servomotor M1, line 84 is connected to the inlet of the second electric servomotor M-2 and line 86 is connected to the inlet of the third servomotor M3. In this embodiment, explosion proof electric servomotors M1 and M2 are located in the base section 42 of the robotic paint applicator and explosion proof electric servomotor M3 is located in the intermediate section 44 of the robotic paint applicator. Line 76 from the first transfer block 72 is connected to the third transfer block 80 which divides the air flow between the remaining electric servomotors M4 to M8 by lines 90 to 98, respectively. Thus, the inlet of each of the electric servomotors M1 to M8 are individually or separately connected to the source 66 of clean non-combustible gas.

Further, the air or another non-combustible gas is discharged from the motor housing 28 through gas outlet 32 as shown in FIG. 1 into the housing enclosures 42, 44 and 46 also shown in FIGS. 2 and 3. In one preferred embodiment of the robotic paint applicator 40, the upper section housing or robot arm 46 is connected by a flexible hose 56 to the intermediate section housing 44 and the intermediate housing 44 is connected by a flexible hose 58 to the base section housing 42. The base housing is connected with a flexible hose 60 to a fourth transfer block 61 which may be located in the support section 50 or any convenient location. As shown in FIG. 6, the fourth transfer block 61 includes the control unit 70 which is connected to the proportional valve 68, such that if the pressure in the housing enclosures 42, 44 and 46 fall below a predetermined minimum greater than atmospheric, the valve 68 is controlled to increase the pressure or air flow through the valve 68 to the first transfer block to maintain the pressure of non-combustible gas in the, housing enclosures 42, 44 and 46 above atmospheric pressure to prevent the entry of combustible gas into the section housings and the electric servomotors. Thus, the air pressure is controlled by valve 68 to first purge the electric servomotors and then maintain a positive pressure of non-combustive gas within the explosion proof motors M1 to M8 and robot section housings 42, 44 and 46.

Figure 5:
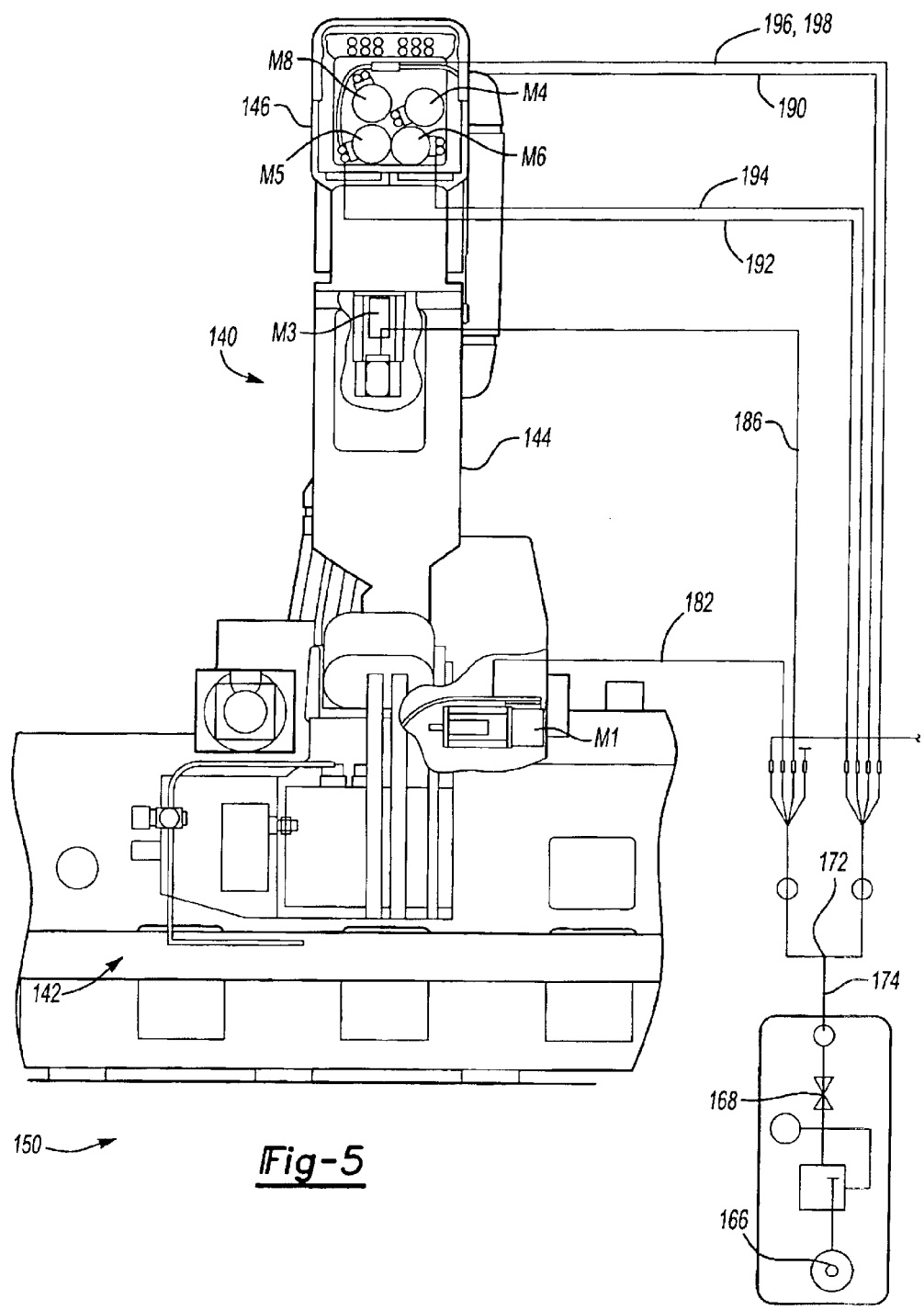
FIG. 5 is an end view of the robotic paint applicator illustrated in FIG. 4 including schematics illustrating the purging system.
Figure 4:
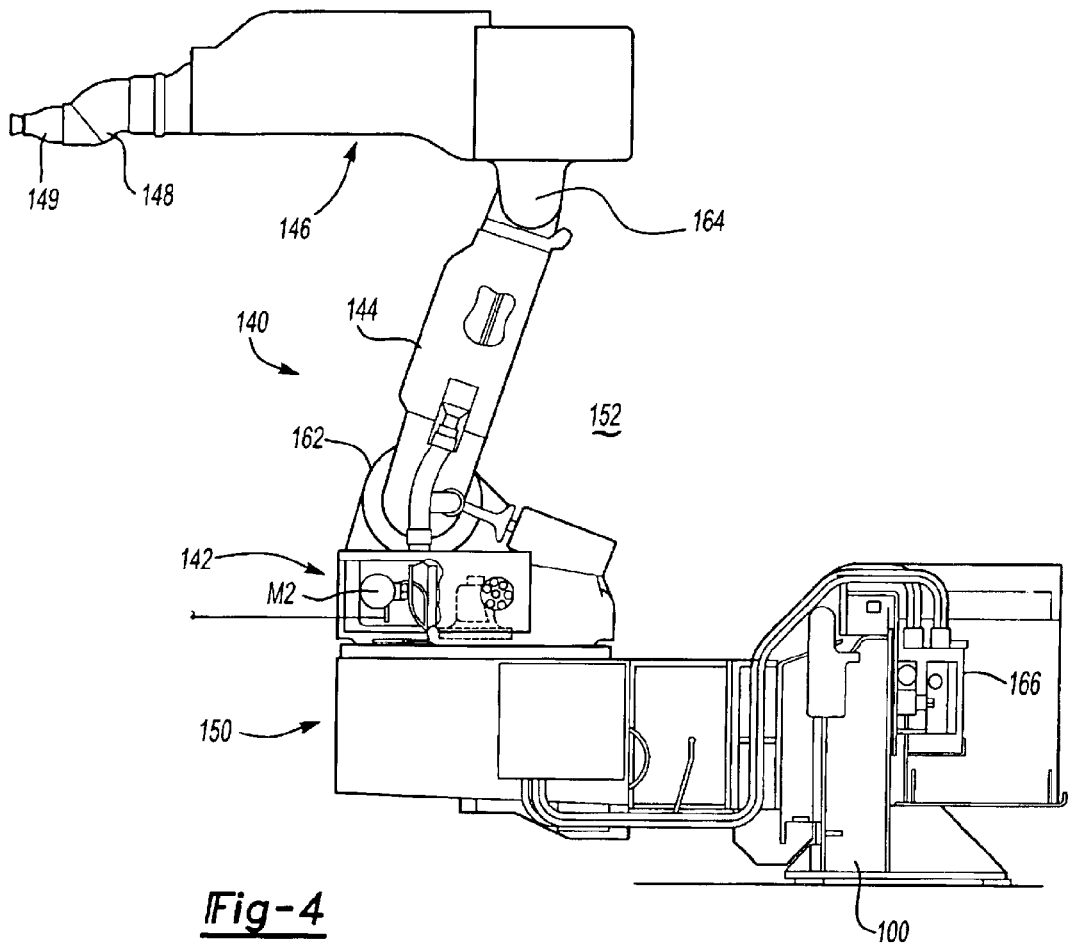
FIG. 4 is partially cross-sectioned side view of an alternative embodiment of the robotic paint applicator of this invention.

The robotic paint applicator 140 illustrated in FIGS. 4 and 5 may be identical to the robotic paint applicator 40 illustrated in FIGS. 2 and 3, except that the base section 142 is supported on a base 150 supported on a rail 100 for movement with the substrate to be painted (not shown). As set forth above, the robotic paint applicator of this invention may be mounted on the floor of the paint booth 52 as shown by robotic paint applicator 40 shown in FIGS. 2 and 3 or the robotic paint applicator 140 shown in FIGS. 4 and 5 may be mounted on a rail 100 best shown in FIG. 4 to traverse the paint spray booth as the substrate (not shown) is moved through the paint spray booth on a conveyor. The air supply and purge system shown in FIG. 6 may also be utilized in the robotic paint applicator 140 shown in FIGS. 4 and 5. All other components of the robotic paint applicator 140 may be identical to the robotic paint applicator 40 described above and have, therefore, been numbered the same in FIGS. 2 and 3 and no further description is required for a complete understanding of this embodiment.

Having described preferred embodiments of the robotic paint applicator, the method of protecting a robotic paint applicator having an explosion proof electric motor from explosion in an enclosed paint booth may now be described. As will be understood from the above description of the preferred embodiments, the method of this invention includes enclosing an electric motor and controls in a substantially air-tight enclosure. In a typical application, the enclosure comprises the housings of the base and intermediate section and the robot arm 42, 44 and 46, respectively, wherein the enclosure is sufficiently air-tight to maintain a positive pressure of non-combustible gas, such as 95%. The method of this invention then includes providing an explosion proof electric motor in a substantially air-tight motor housing, such as the electric servomotor 20 illustrated in FIG. 1 having a substantially air-tight motor housing 28, including a gas inlet 30 and a gas outlet 32. The method of this invention then includes purging the motor housing 28 and the enclosure by supplying a non-combustible gas under a first pressure to the gas inlet 30 of the motor housing 28 under sufficient pressure to circulate the non-combustible gas through the motor housing and through the gas outlet 32 into the enclosure, purging the motor housing and the enclosure of potentially combustible gas. In a preferred embodiment, air is supplied to the inlet 30 of the motor housings 28 under a pressure between 3 and 5 bars, preferably about 4 bars, and the volume of air supplied to the explosion proof electric servomotor during purging is between 5 and 10 times the volume of the motor housing and the enclosure, assuring complete purging of potentially combustible gas from both the motor housing and the enclosure. Of course, where the enclosure includes a plurality of electric servomotors, the volume of air supplied to the electric servomotor may be adjusted accordingly. The explosion proof electric servomotors may then be operated with safety. The final step in the method of this invention includes continuing to supply non-combustible gas to the gas inlets of the electric servomotor housings at a second pressure less than the first pressure used during purging, but sufficient to maintain a positive pressure of non-combustible gas in the motor housings and the enclosure. An air pressure of about 85 mbar will be sufficient in most cases to assure maintaining a positive air pressure in the motor housings 28 and the housing enclosures 42, 44 and 46 containing the electric servomotors, preventing entry of potentially combustible gas into the enclosures and the electric servomotor housings.

More specifically, the method of protecting a paint robot in an explosion atmosphere of this invention, wherein the robotic paint applicator includes a plurality of substantially air-tight housing sections, each having an explosion proof motor including a motor housing having a gas inlet and a gas outlet, includes separately supplying a non combustible gas under pressure to the inlet 30 (see FIG. 1) of each of the explosion proof electric motors 20 which circulates through the motor housing 28 and is received from the gas outlet 32 into the housing enclosures 42 or 142, 44 or 144 and 46 or 146 as described above. In a preferred embodiment, the housing enclosures are substantially sealed as described above and interconnected by conduits or tubes 58 and 56 and one of the housing members 42 is connected by a conduit or tube 60 to a transfer block 61 including a pressure activated control 70 connected to the air inlet valve 68, wherein the method of this invention further includes sensing the pressure in the housing members and increasing the pressure by regulating the inlet valve 68 in the event that the pressure in the housing members falls below a predetermined minimum, such as 85 mbars. Further, as described above, the method of this invention includes first purging or flushing the motor housings by directing a non-combustible gas, preferably air, under pressure into the components of the electric motor, purging the motor housing and the robot housing members prior to actuation of the explosion proof motors, such that both the electric motors and the robot housing enclosures are explosion proof.

As will be understood by those skilled in this art, a commercial embodiment of the robotic paint applicator of this invention will include numerous other electrical and pneumatic components including the servo valves S1 and S2 shown in FIG. 6, a brake and brake valve, also shown in FIG. 6, filters and the like which are shown in the drawings to complete the disclosure of the robotic paint applicator, but not described, because they do not form part of this invention.

Figure 7:
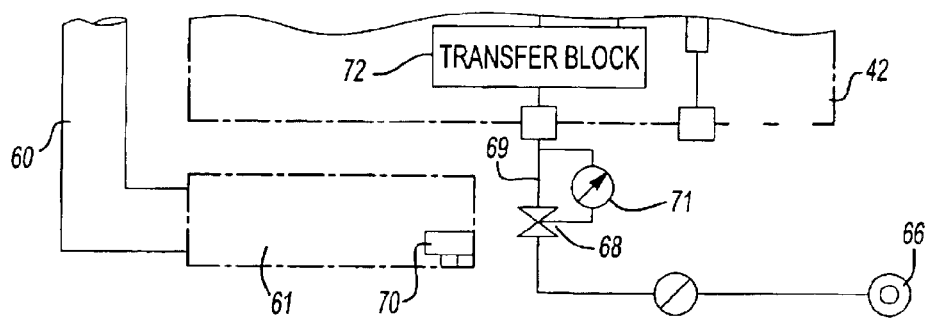
FIG. 7 is a partial schematic illustration of an alternative embodiment of the purge system which may be utilized in the robotic paint applicators of FIGS. 2 to 5.

FIG. 7 illustrates in schematic form an alternative embodiment of the control and purge system which may be utilized in the robotic paint applicators illustrated in FIGS. 2 to 5 which includes a pressure regulator 71 between the valve 68 and the transfer block 72 which regulates the pressure of the non-combustible gas delivered from the source 66. As will be noted from FIG. 7, the pressure regulator 71 is in parallel with the line 69 between the source of non-combustible gas and the transfer block 72 providing further optional control of the pressure of non-combustible gas to the robotic paint applicator. The control 70 in the third transfer block 61 may be optionally connected to the main control valve 68 as described above with reference to FIG. 6. The robotic control and purge system illustrated in FIG. 7 may be otherwise identical to the system disclosed in FIG. 6.

Having described preferred embodiments of the robotic paint applicator and method of this invention, it will be understood that various modifications may be made within the purview of the appended claims. For example, the robotic paint applicator of this invention and method is not limited to the disclosed embodiments. The robotic paint applicator may include any number of housing sections or modules and each section may include any number of explosion proof electric motors depending upon the application. Further, the purge and pressurizing system may be utilized with any electric motor and is, therefore, not limited to an electric servomotor as disclosed and described. As will be understood, the embodiment of the explosion proof electric servomotor disclosed in FIG. 1 is a modification of a conventional electric servomotor to include a housing having gas inlet and outlet ports and the housing has been enlarged to assure circulation of non-combustible gas and purging of the electrical components. Further, the gas inlet and outlet may be located in various portions of the motor housing, but are preferably spaced to assure complete purging. As used herein, the term "paint" is intended to cover any coating which may be applied to a substrate and is not limited to color coatings or conventional paint. However, a purge and circulation system will not be required for coatings which do not include a potentially explosive carrier or solvent. Finally, non-combustible gas may be any suitable non-combustible or non-explosive gas including an inert gas, such as nitrogen or a noble gas, but air is preferred for reasons of cost and convenience.

What is claimed is:

1. A robotic paint applicator located in an enclosed paint booth having a potentially combustible atmosphere, said robotic paint applicator comprising: a first substantially air-tight housing enclosure including a first explosion proof electric motor therein, a second substantially air-tight housing enclosure mounted on said first housing enclosure containing a second explosion proof electric motor therein, and a robot arm mounted on said second housing enclosure having a paint applicator, said first and second explosion proof electric motors each including an enclosed motor housing, a gas inlet and a gas outlet, a source of non-combustible gas located outside said enclosed paint booth, a first gas line connected to said source of non-combustible gas and separate gas lines connecting said first gas line to each of said gas inlets of said motor housings directing non-combustible gas into said motor housings through said gas inlets of said motor housings, creating a positive pressure of non-combustible gas in said motor housings, preventing entry of said potentially combustible atmosphere and said non-combustible gas received in said first and second enclosures from said gas outlets of said motor housings creating a positive pressure of non-combustible gas in said in said first and second housing enclosures, preventing entry of said potentially combustible atmosphere in said first and second enclosures, a valve controlling flow of non-combustible gas through said first gas line and a pressure sensitive control connected to said valve maintaining a predetermined pressure of non-combustible gas in said housing enclosures.

2. A method of protecting a paint robot, wherein said paint robot includes a plurality of relatively movable substantially air-tight robot housing enclosures each having an explosion proof motor therein including a motor housing having a gas inlet and a gas outlet spaced from said gas inlet, said method comprising the following steps:

directing a non-combustible gas under pressure into said gas inlet of each of said motor housings, creating a positive pressure of non-combustible gas within said motor housings;

directing said non-combustible gas from said motor housings into said robot housing enclosures creating a positive pressure of non-combustible gas within said robot housing enclosures; and controlling said positive pressure of non-combustible gas by continuously determining said pressure of non-combustible gas and operating a valve to maintain said pressure of non-combustible gas at a pressure greater than atmospheric pressure.

3. The method of protecting a paint robot as defined in claim 2, wherein said method includes purging said motor housings and said robot housing enclosures by directing said non-combustible gas to said gas inlets of each of said motor housings at a pressure of at least about four bars.

4. A robot for use in a potentially combustible atmosphere, comprising:

a substantially air-tight first robot component enclosure having an explosion proof electric motor therein;

a second robot component enclosure mounted on said first robot component enclosure for movement relative to said first robot component enclosure upon actuation of said explosion proof electric motor;

said explosion proof electric motor including a motor housing enclosing electrical components of said electric motor including a rotor and a stator having a gas inlet communicating with said rotor and stator and a gas outlet spaced from said gas inlet; and a source of non-combustible gas under pressure connected to said gas inlet of said motor housing directing non-combustible gas under pressure into said motor housing including said rotor and stator, thereby purging and preventing entry of potentially combustible atmosphere into said motor housing, and said gas outlet of said motor housing directing non-combustible gas under pressure into said first substantially air-tight robot component enclosure, thereby purging and maintaining a positive pressure of non-combustible gas in said substantially air-tight first robot component enclosure and preventing entry of potential combustible atmosphere into said first robot component enclosure.

5. The robot as defined in claim 4, wherein said second robot component enclosure is substantially air-tight and includes a second explosion proof electric motor and said second explosion proof electric motor including a second motor housing enclosing electrical components of said second electric motor including a rotor and a stator, a gas inlet communicating with said explosion proof rotor and stator and a gas outlet spaced from said gas inlet of said second motor housing, and said source of non-combustible gas connected to said gas inlet of said second motor housing, thereby purging and directing non-combustible gas under pressure into said second motor housing preventing entry of potentially combustible gas into said second motor housing including said rotor and stator, and said gas outlet of said second motor housing directing non-combustible gas into said second robot component enclosure, thereby purging and maintaining a positive pressure of non-combustible gas in said second robot component enclosure and preventing entry of potentially combustible gas into said second robot component enclosure.

6. The robot for use in a potentially combustible atmosphere as defined in claim 4, wherein said source of non-combustible gas is connected to said gas inlet of said motor housing by a gas line having a valve and a pressure sensitive control connected to said valve operating said valve to maintain a predetermined pressure of non-combustible gas in said motor housing and said substantially air-tight first robotic enclosure.

7. The robot as defined in claim 4, wherein said robot is a robotic paint applicator for use in a paint spray booth having a potentially combustible atmosphere, said second robot component enclosure including a robot arm having a paint applicator.

8. The robot as defined in claim 4, wherein said explosion proof electric motor is an electric servomotor and said motor housing is substantially air-tight having an inlet chamber, including said gas inlet, and a second chamber containing said electrical components of said electric motor, including said rotor and stator and said gas inlet circulating non-combustible gas through said second chamber.

9. A robotic paint applicator for use in an enclosed paint spray booth having a substantially combustible atmosphere, said robotic paint applicator comprising:

a first substantially air-tight robot housing enclosure having a first explosion proof electric motor therein;

a second substantially air-tight robot housing enclosure mounted on said first air-tight robot housing enclosure for relative movement thereon having a second explosion proof electrical motor therein;

said first and second explosion proof motors including a motor housing enclosing electrical components of said first and second explosion proof electric motors including a rotor and a stator, and said motor housings each including a gas inlet communicating with said rotor and stator and a gas outlet;

a source of non-combustible gas located outside said paint spray booth connected to each of said gas inlets of said motor housings of said first and second explosion proof motors directing non-combustible gas into said gas inlets of said motor housings to said rotor and stator, purging said motor housings of combustible gas and maintaining a positive pressure of non-combustible gas within said motor housings; and said gas outlets of said motor housings directing non-combustible gas under pressure into said first and second substantially air-tight robot housing enclosures purging said first and second air-tight robot housing enclosures of combustible gas and maintaining a positive pressure of non-combustible gas in said first and second substantially air-tight robot housing enclosures.

10. The robotic paint applicator as defined in claim 9, wherein said source of non-combustible gas is connected to said gas inlets of said motor housings by a gas line having a valve and a pressure sensitive control in each of said first and second substantially air-tight robot housing enclosures connected to said valve maintaining a predetermined positive pressure of non-combustible gas in said first and second substantially air-tight robot housing enclosures.

11. The robotic paint applicator as defined in claim 9, wherein one of said first and second substantially air-tight robot housing enclosures includes a third explosion proof electric motor having a motor housing enclosing electric components of said third explosion proof electric motor including a rotor and a stator, and said motor housing of said third explosion proof electric motor including a gas inlet communicating with said rotor and stator and a gas outlet, and said source of non-combustible gas connected to said gas inlet of said motor housing of said third explosion proof electric motor directing non-combustible gas into said motor housing of said third explosion proof electric motor to said rotor and stator and said gas outlet of said motor housing of said third explosion proof electric motor directing non-combustible gas into said one of said first and second substantially air-tight robot housing enclosures.

12. A method of protecting a robot in a potentially combustible atmosphere, said robot including a substantially air-tight robot enclosure having an explosion proof electric motor therein and said explosion proof electric motor including a substantially air-tight motor housing enclosing electric components of said explosion proof electric motor including a rotor and a stator having a gas inlet communicating with said rotor and stator and a gas outlet, said method comprising the following steps:

directing a non-combustible gas to said gas inlet of said motor housing at a first pressure into said motor housing including said rotor and stator, and directing said non-combustible gas from said gas outlet of said motor housing into said robot enclosure, thereby purging said motor housing and said robot enclosure of combustible gas;

directing said non-combustible gas to said gas inlet of said motor housing at a second pressure greater than atmospheric pressure and less than said first pressure to said gas inlet of said motor housing and directing said non-combustible gas from said gas outlet of said motor housing into said robot enclosure, thereby maintaining a positive pressure of non-combustible gas in said motor housing and said robot enclosure preventing combustible gas from entering said motor housing and said robot enclosure; and actuating said explosion proof electric motor with said rotor and stator in a non-combustible atmosphere within said motor housing.

13. The method as defined in claim 12, wherein said method includes directing said non-combustible gas to said gas inlet of said motor housing at a first pressure of about 4 bars.

14. The method as defined in claim 12, wherein said method includes directing said non-combustible gas to said gas inlet of said motor housing by supplying a volume of said non-combustible gas to said gas inlet of about 5 to 10 times a volume of said motor housing and said enclosure.

15. The method as defined in claim 12, wherein said method includes directing a non-combustible gas to said gas inlet of said motor housing at a second pressure of at least 0.8 mbar.

* * * * *

UNITED STATES PATENT AND TRADEMARK OFFICE
CERTIFICATE OF CORRECTION

PATENT NO. : 6,835,248 B1
DATED : December 28, 2004
INVENTOR(S) : Jürgen Haas, Thomas Hezel and Marcus Frey It is certified that error appears in the above-identified patent and that said Letters Patent is hereby corrected as shown below:

Title page,
Item [54], Title, should be corrected to read -- ROBOTIC PAINT APPLICATOR AND METHOD OF PROTECTING A PAINT ROBOT HAVING AN EXPLOSION PROOF ELECTRIC MOTOR. --

Column 10,
Line 36, please delete the duplicate words "in said" to read -- in said first and second housing enclosures, prevent... --

Signed and Sealed this

Fifth Day of April, 2005

JON W. DUDAS
*Director of the United States Patent and Trademark Office*